United States Patent [19]
Whitney

[11] 3,748,964
[45] July 31, 1973

[54] ONE DIMENSION CAM TRACER FOR AN AUTOMATIC MILLING MACHINE

[75] Inventor: Herbert A. Whitney, Windsor, Conn.

[73] Assignee: United Aircraft Corporation, East Hartford, Conn.

[22] Filed: May 31, 1972

[21] Appl. No.: 258,278

[52] U.S. Cl. .................................. 90/13 B, 90/62 R
[51] Int. Cl. ............................................... B23c 1/16
[58] Field of Search ......................... 90/13 B, 62 R

[56] References Cited
UNITED STATES PATENTS
2,810,327   10/1957   Schmid .............................. 90/62 R FOREIGN PATENTS OR APPLICATIONS
976,589   12/1963   Germany ............................. 90/62 R

*Primary Examiner*—Gil Weidenfeld
*Attorney*—Leonard Weiss

[57] ABSTRACT

A machine bed is displaced in one plane in response to the pressure of a first stylus upon a first cam surface. Displacement along an axis orthogonal to the plane is in response to the pressure of a second stylus upon a second cam surface which is transmitted via a lever and a gimbal to the first stylus.

2 Claims, 3 Drawing Figures

ONE DIMENSION CAM TRACER FOR AN AUTOMATIC MILLING MACHINE

BACKGROUND OF THE INVENTION

1. Field of the Invention

This invention relates to machining apparatus and more particularly to an improvement to an automatic hydro copy miller manufactured by Rigid Limited.

2. Description of the Prior Art

In the hydro copy miller manufactured by Rigid Limited, a machine bed is displaced in response to pressure applied to a stylus. The stylus is made to traverse a three-dimensional cam surface whereby desired displacements of the machine bed in an X, Y and Z direction are achieved in accordance with pressure of the cam surface upon the stylus. In the Rigid machine, it is well known that a cam which causes a displacement of the machine bed in the Z direction may coupled an undesired pressure upon the stylus in the X and Y direction thereby causing an undesired displacement of the machine bed. Accordingly, it is a usual practice to use the hydro copy miller only when very small displacements in the Z direction are required. Machining which requires substantial displacement in the Z direction is performed by another machine, such as a pantograph.

Heretofore, the utility of the hydro copy miller has been limited because accurate displacement of the machine bed in the Z direction could not be achieved.

SUMMARY OF THE INVENTION

The object of the present invention is to provide a simplified automatic hydro copy miller.

According to the present invention, displacement of a machine bed in one plane is in response to the pressure of a first stylus upon a first cam surface representative of the desired displacement of said machine bed in said plane; displacement of said machine bed in a direction orthogonal to said plane is in response to the pressure of a second stylus upon a second cam surface representative of the desired displacement in said orthogonal direction; the pressure of said second stylus upon said second cam surface is transmitted by a transmission means to said first stylus.

The present invention provides for complex automatic machining in one operation which had heretofore been performed in a plurality of operations.

Other objects, features and advantages of the present invention will become more apparent in the light of the following detailed description of a preferred embodiment thereof as illustrated in the accompanying drawing.

DESCRIPTION OF THE PREFERRED EMBODIMENT

The present invention is an improvement of an automatic hydro copy miller model KA–200 manufactured by Rigid Limited of Rorschacherberg, Switzerland. The model KA–200 machine is well known and described in an instruction manual published by Rigid.

Figure 1:
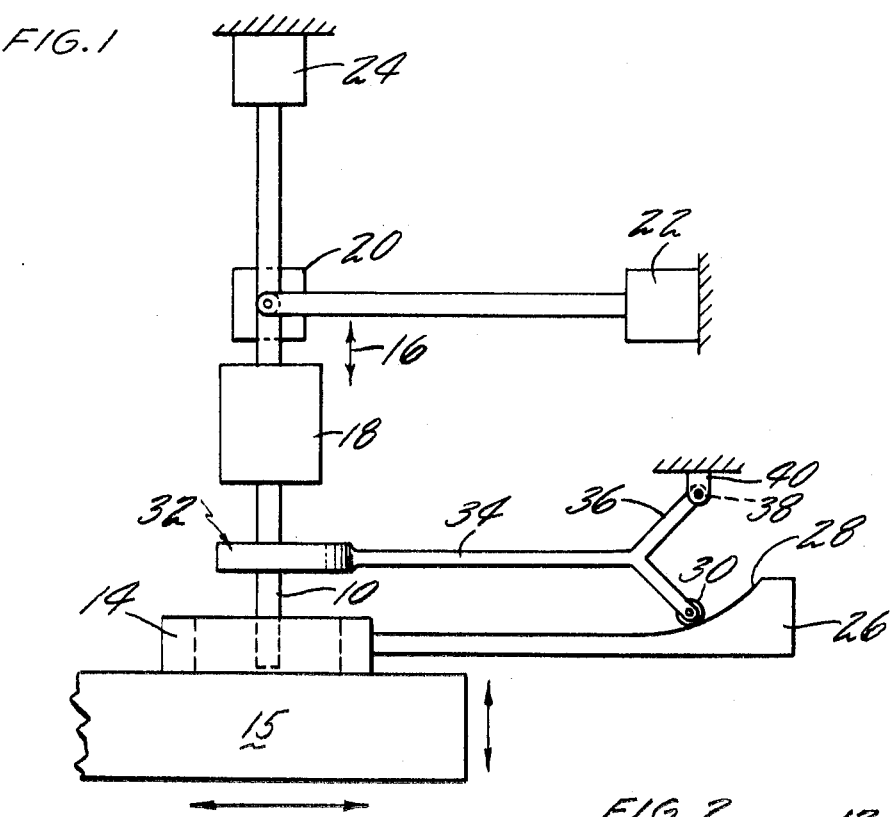
FIG. 1 is a schematic showing of the preferred embodiment of the present invention.
Figure 2:
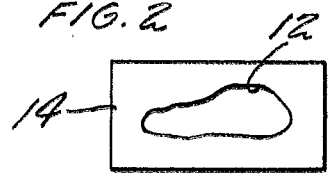
FIG. 2 is a top view of a cam in the embodiment shown in FIG. 1.

Referring now to FIGS. 1 and 2, a tracer stylus 10 (FIG. 1) makes contact with the edge of a cam surface 12 (FIG. 2) of a cam 14. The cam 14 is mounted upon a machine bed 15. The bearing pressure of the cam surface 12 upon the stylus 10 (FIG. 1) causes small error rotations thereof about a pair of mutually orthogonal axes which are orthogonal to a vertical Z axis which is in the direction of an arrow 16. The rotations are transmitted through a transmission member 18 to hydraulic servo valves 20, 22 which cause the drive mechanism of the machine to move the machine bed 15 in a direction to bring the rotation to a null but maintain contact between the stylus 10 and the cam surface 12. The machine bed 15 is moved by the drive mechanism of the machine to cause the stylus 10 to trace the cam surface 12. Therefore, a stationary cutting tool may be made to cut a workpiece (the cutting tool and the workpiece are not shown) in accordance with the motion of the machine bed 15.

Figure 3:
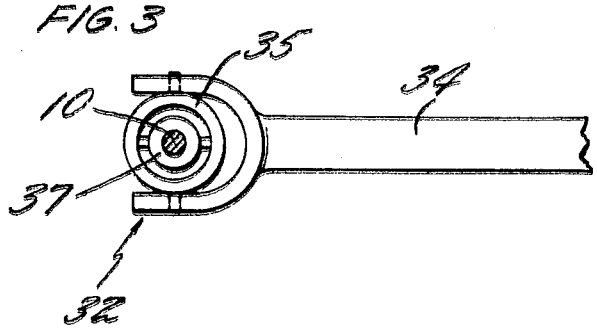
FIG. 3 is a top view of the gimbal in the embodiment shown in FIG. 1.

Pressure of the stylus 10 in the Z direction causes a small error displacement thereof which activates a hydraulic valve 24, causing a corresponding displacement of the machine bed 15. According to the present invention a cam 26 has a cam surface 28 which is representative of desired displacement of the stylus 10 in the Z direction at every location of the stylus 10 along the contour 12 (FIG. 2). Referring to FIGS. 1–3, a second stylus 30 is connected through a gimbal 32 and a lever 34 to the first stylus 10. The lever 34 and the stylus 10 are respectively connected to an outer ring 35 and an inner ring 37 of the gimbal 32. An extension 36 of the lever 34 is pivotally connected to a pivot 38 to a stationary member 40. Displacement of the stylus 10 along the contour 12 causes a corresponding displacement of the stylus 30 along the cam surface 28. Pressure in the direction of the Z axis upon the stylus 30 are transmitted to the first stylus 10 causing a corresponding pressure thereupon in the direction of the Z axis; components of pressure in directions orthogonal to the Z axis are not transmitted through the gimbal 32 to the stylus 10, therefore the valves 20, 22 are not activated by the pressure of the stylus 30 upon the cam surface 28.

Although the invention has been shown and described with respect a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. In an automatic copy milling machine where a machine bed is displaced in relation to a cutting tool in accordance with pressure applied to a first stylus, the improvement comprising:

a first cam connected to said machine bed, said first cam having a first cam surface in contact with said first stylus, said first cam surface defining a pattern in one plane in accordance with the desired displacement of the machine bed in a given plane;

a second stylus;

a second cam mounted upon a machine bed, said second cam having a second cam surface in contact with said second stylus, said second cam surface representative of the desired displacement of said machine bed in a direction orthogonal to the pattern of said first cam;

means for moving said machine bed to cause said first and second styluses to continuously contact portions of said first and second cam surfaces, respectively; and means for transmitting displacement in the orthogonal direction of said second stylus by contacting the profile of said second cam surface to said first stylus thereby causing a corresponding displacement of the machine bed in a direction orthogonal to the given plane.

2. Apparatus according to claim 1 wherein said transmitting means comprise:

a gimbal having an inner ring thereof connected to said first stylus; and a lever having ends fixedly attached to said second stylus and to an outer ring of said gimbal respectively, said lever being long compared to displacements of the stylus in the Z direction.

* * * * *